US006463148B1

(12) United States Patent
Brady

(10) Patent No.: US 6,463,148 B1
(45) Date of Patent: *Oct. 8, 2002

(54) BLENDING COMMUNICATIONS IN A CALL CENTER

(75) Inventor: Patrick K. Brady, Glen Ellyn, IL (US)

(73) Assignee: Apropos Technology, Oakbrook Terrace, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/685,033

(22) Filed: Oct. 10, 2000

Related U.S. Application Data

(63) Continuation of application No. 08/813,970, filed on Mar. 3, 1997, which is a continuation-in-part of application No. 08/758,063, filed on Nov. 27, 1996, which is a continuation of application No. 08/595,961, filed on Feb. 6, 1996, now abandoned, which is a division of application No. 08/450,268, filed on May 25, 1995, now Pat. No. 5,557,668, which is a continuation of application No. 07/904,196, filed on Jun. 25, 1992, now abandoned.

(51) Int. Cl.[7] .................................................. H04M 3/00
(52) U.S. Cl. ........................... 379/265.01; 379/266.01; 379/309
(58) Field of Search .................... 379/265.01, 266.01, 379/309, 201.01

(56) References Cited

U.S. PATENT DOCUMENTS

| 4,289,934 A | 9/1981 | Pitroda et al. |
| 4,694,483 A | 9/1987 | Cheung |
| 4,785,408 A | 11/1988 | Britton et al. |
| 4,894,861 A | 1/1990 | Fujioka |
| 4,942,602 A | 7/1990 | Baker, Jr. et al. |
| 4,949,373 A | 8/1990 | Baker, Jr. et al. |
| 4,972,461 A | 11/1990 | Brown et al. |
| 5,001,710 A | 3/1991 | Gawrys et al. |
| 5,008,930 A | 4/1991 | Gawrys et al. |
| 5,036,535 A | 7/1991 | Gechter et al. |
| 5,097,528 A | 3/1992 | Gursahaney et al. |
| 5,144,653 A | 9/1992 | Masuoka |
| 5,168,515 A | 12/1992 | Gechter et al. |
| 5,181,239 A | 1/1993 | Jolissant |
| 5,210,789 A | 5/1993 | Jefffus et al. |
| 5,214,688 A | 5/1993 | Szlam et al. |
| 5,247,569 A | 9/1993 | Cave |
| 5,402,474 A | 3/1995 | Miller et al. |
| 5,467,391 A | 11/1995 | Donaghue, Jr. et al. |
| 5,519,773 A | 5/1996 | Dumas et al. |
| 5,884,032 A | 3/1999 | Bateman et al. |
| 5,991,393 A | 11/1999 | Kamen |

OTHER PUBLICATIONS

Borton, George F., Request and Status Links—A New Way to Link Computers and PBXs, Feb. 1990, Business Communications Review, pp. 29–33.

Borton, George F., Switch to Computer Links: The First Two Years, Mar. 1992, Business Communications Review, pp. 27–31.

*Primary Examiner*—Creighton Smith
(74) *Attorney, Agent, or Firm*—Shaw Pittman LLP

(57) ABSTRACT

A call processor in a call center provides agents with enhanced ability to handle multiple types of communications in a consistent manner. Information related to communications received by the call processor are displayed to agents in the call center in queue lists. Agents can select calls for further processing from the information presented in the queue lists.

30 Claims, 9 Drawing Sheets

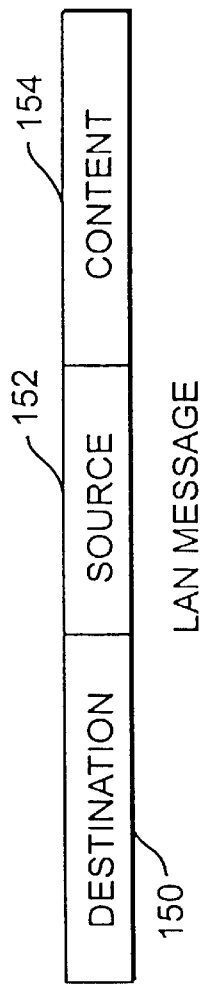
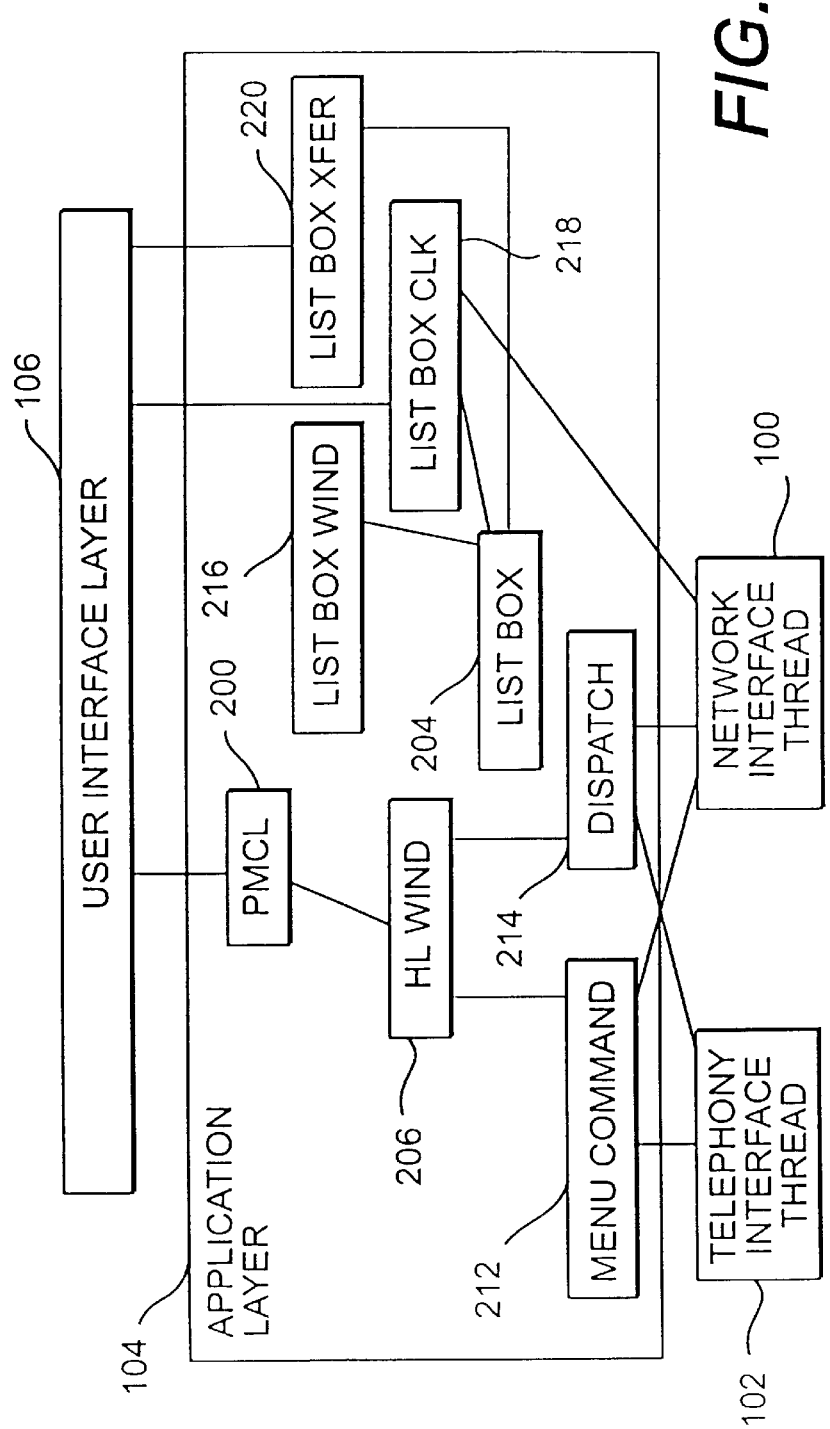

BLENDING COMMUNICATIONS IN A CALL CENTER

This application is a continuation of U.S. patent application Ser. No. 08/813,970 filed Mar. 3 1997 (still pending), which is a continuation-in-part of U.S. patent application Ser. No. 08/758,063, filed Nov. 27, 1996 (still pending), incorporated by reference herein in its entirety, which is a continuation of U.S. patent application Ser. No. 08/595,961, filed Feb. 6, 1996 (now abandoned) which is a divisional of U.S. patent application Ser. No. 08/450,268, filed May 25, 1995 (now U.S. Pat. No. 5,557,668), incorporated by reference herein in it entirety, which is a continuation of U.S. patent application Ser. No. 07/904,196, filed Jun. 25, 1992 (now abandoned).

FIELD OF THE INVENTION

This invention relates to a novel call distribution system that can be implemented in any telephonic environment with all existing equipment. More particularly, the present invention relates to blending a multiple types of communication in a call center environment.

BACKGROUND

As communications technology continues to advance, methods of communication between businesses and their customers are becoming increasingly diverse. Examples of this diversity are prevalent in routine business transactions. Businesses and customers routinely communicate using facsimile transmissions and e-mail over such diverse communication channels including phone lines, the internet, and a company's local intranet. To better serve their customers, businesses must find new ways to communicate with their customers that take full advantage of the diversity of telecommunications technology available.

This is especially vital in the call center environment where the typical paradigm has been the use of the telephone communication. While telephone communication is the prevalent form of the customer communication in this environment, the increasing popularity of the internet and the increasing use of facsimile (fax) transmission to communicate indicates that call centers should enhance their processing capabilities to deal effectively with the new technologies.

Moreover, call centers have typically been concerned with receiving calls. That is, the agents in the call centers are not typically set up to perform outbound calling. This limitation can be critical where callers are disconnected, hang up, or are otherwise not serviced by an agent. In such a case it would be beneficial to have a call center environment that facilitates outbound calling so that agents can reach potential customers, that would otherwise be lost.

SUMMARY OF INVENTION

The present invention solves the forgoing deficiencies in the call center environment by "blending" the various types of communications that the call center can receive and presenting information related to the various types of communications that are received to agents. The information is presented to the agents in a queue list, which lists the various types of "calls" and provides information related to each such "call." Such information can include the caller's identification, the call type and the reason for the call. The "calls" can be inbound calls, outbound calls, e-mail messages, facsimile (fax) transmissions, or any other type of communication, whether now known, or hereafter developed.

From the queue list, an agent can select which "call" to further process. By blending the various types of communication into a common form for presentation to a call center's agents, the present invention solves the aforementioned deficiencies in the art related to a call center's providing convenience to its customers that may want to use various forms of communication. Such forms of communication include, but are not limited to, telephony, e-mail and facsimile fax transmission. In fact, any communication type that is now known or heretofore developed and that can be reduced to a computer usable form can be encompassed by the present invention.

As previously mentioned, the present invention also blends outbound call processing with inbound call processing. This enables agents to conveniently place outbound calls for whatever reason such outbound calling may be required. For example, outbound calling may be required to reach a potential customer that was disconnected from the call queue, but for whom sufficient information is known to return a call to the disconnected caller. Various methods exist for obtaining such information including caller identification methods, and call preprocessing to extract information from the caller prior to the caller's reaching an agent. To enable outbound call processing, the present invention blends outbound calls into the agent's queue list such that agents can see information related to the outbound call. Outbound calling can be on an agent selective basis or be forced on agents that are idle, or otherwise deemed appropriate to perform the outbound call.

To blend the various types of communication, including outbound calls, the present invention employs a "Blender" process responsive to the particular communication in question. For example, a Fax responder responds to fax messages and provides appropriate processing to enable information related to the fax transmission to be present to the agents in the call center that handle fax transmissions. The information is presented to the agents in their respective queue lists. Agents can select any call to process from their respective queues, regardless of whether the "call" is an inbound telephone call or some other form of communication. By giving call center agents the flexibility to handle multiple types of communication is a seamless manner, and additionally facilitating outbound calling, the present invention greatly enhances the call processing capability of today's call centers.

In one embodiment of the invention, a call processor in a call center has one or more agents to answer calls. Each agent uses an agent computer to help process the calls. The call processor also has a central computer for running a blender process. The blender process blends multiple types of communications for display to each agent. The central computer is connected to each agent via a computer network. Each agent computer contains a display device for presenting information related to the communications that are to be processed by the call center. The information is displayed in a queue list on each agent's display device. A message router is used to transmit the information related to the communications that are to be processed by agents in the call center.

BRIEF DESCRIPTION OF THE DRAWINGS

FIG. 3 shows a schematic of an interprocess message.

FIG. 4 shows a more detailed schematic of the software running on the PC showing the communication links between the processes and subprocesses.

DETAILED DESCRIPTION OF THE INVENTION

Figure 1:
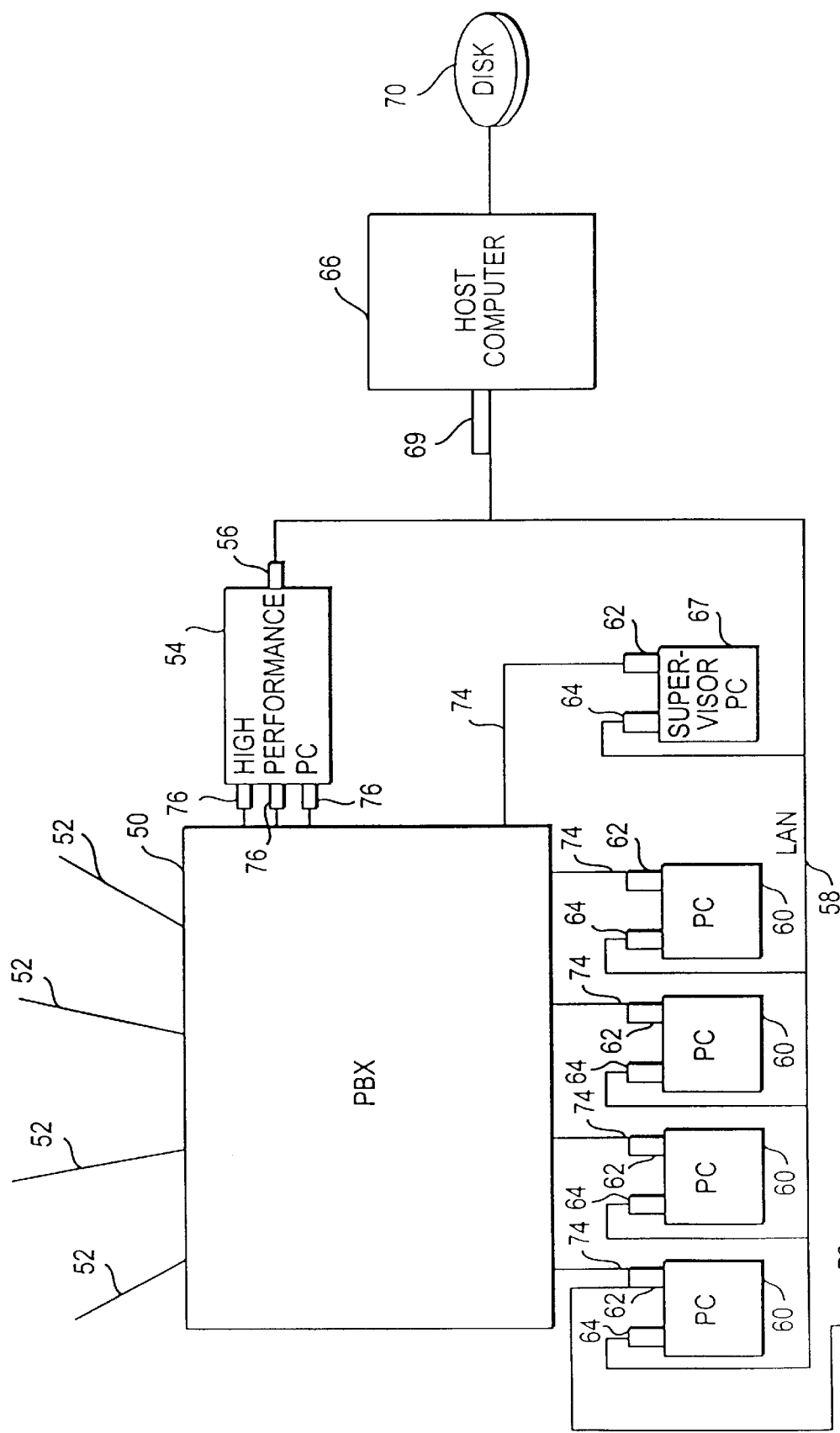
FIG. 1. shows a schematic of a first embodiment of the call distribution system of the invention comprising a local area network and telephony interface cards, showing. the hardware connections between the components of the system.

In one embodiment of the invention, shown in FIG. 1, a PBX 50, serving one or more telephone lines 52 is connected to multiple telephony interface cards 62 and 76. In this embodiment, the telephone lines 52 are any lines that come from a central office or Centrex maintained by the telephone company. The telephony interface cards (TIC) 62 and 76 are telephony interface devices consisting of boards that plug into the main board of an IBM compatible personal computer to provide the personal computer access to telephony functions. One such board, the VBX100, manufactured by Natural Microsystems, is a device that has a telephony connection with the PBX, for example an analog tip and ring connection, and which provides measurement and control through relays and a digital signal processor. In other embodiments, the telephony interface cards 62 and 76 establishes a telephony interface with the PBX using other types of telephony connections, such as T1 or ISDN. The telephony interface device can be any device that can establish a telephony connection with the telephone line or PBX, and provide telephony functions such as dialing, answering, and receiving and transmitting signals, such as voice signals, over the telephone line 74 or 52. It also must be able to establish a data and control connection with the rest of the system and provide for control of its telephony functions via its data and control connection.

In the embodiment under consideration, the Telephony interface cards 62 and 76 have resident firmware and memory for downloadable programs. Access to the telephony interface cards 62 is made through a data and control connection to the PC 60. Access to the telephony interface cards 76 is made through a data and control connection to the high performance PC 54. In this embodiment access is made through a standard AT bus. Any type of data connection, such as RS-232 or other Serial or parallel standards may be employed. All telephony functions, such as loop current detection or sending touch-tones are provided by the telephony interface controller cards 62 and 76.

The telephony interface cards 76 are connected to another PC 54, which is preferably a high performance personal computer (PC). This PC 54 also has a network port 56, such as another network interface card, to a Local Area Network (LAN) 58. The high performance PC 54 is in one embodiment an IBM compatible PC running a fast processor such as an Intel 80486 microprocessor. Although a high performance PC is desirable, the system could use, in place of the high performance PC 54, any computer capable of connecting to telephony interface cards 76 and the LAN 58. If an implementation of the invention requires more telephony interface cards 76 than can be accommodated by a desired high performance PC, multiple high performance PCs can be used, each high performance PC having a set. of telephony interface cards 76 and each high performance PC having a data connection to the LAN 58. The LAN 58 also has links to one or more personal computers (PCs) 60, each equipped with a telephony interface card 62, for communicating with the PBX 50, and each equipped with a network interface card 64 for communicating with the LAN 58. Telephony equipment, such as a headset 72, is connected to the telephony interface card 62. Incoming calls are first received by the telephony interface cards 76 which hold the calls until an agent operating a PC 60 and using a headset 72 is available to receive the call. Before a call is transferred, the telephony interface card 76 may send audible voice messages to the caller and elicits touch tone digit responses from the caller. The information contained in the digit responses is received by a CCP process 254 and can be used to decide which agent should receive the call, or can be used to obtain from a database information that pertains to the caller's identity or to the purpose of the call, or other information. All or part of this database information may be passed to a PC 60 at the time its agent receives the call.

The incoming phone lines 52 are received by the PBX 50 in the embodiment under consideration; however, a PBX is not required for the use of the invention. The PBX may be configured according to analog or digital protocols, including ISDN protocols. The system of the invention is adaptable to any standard or protocol. In one embodiment, analog protocols are used.

The preferred operating system running on the PCs 60 is an operating system that provides for multi-tasking, such as the IBM OS/2 operating system. Other multi-tasking, or non-multi-tasking operating systems may also be used. Any computer can be used and the invention is not restricted to IBM compatible PCs or even to personal computers.

The network interface card 64 is, in the embodiment under consideration, an ethernet standard networking device. Several device driver programs can be used to control low level access to the network interface controller card 64, including, but not limited to Novell's NE1000 board device, Novell's named pipe device driver and Novell's requestor for OS/2 driver. The LAN 58 is also connected to a network interface card 69 that is connected to a host computer 66 running an application program which controls access to and retrieval of information from a data base optionally stored on a storage device 70. The agent's PCs 60 each run a session of this application program that communicates with the server or host application program over the LAN 58.

Figure 2:
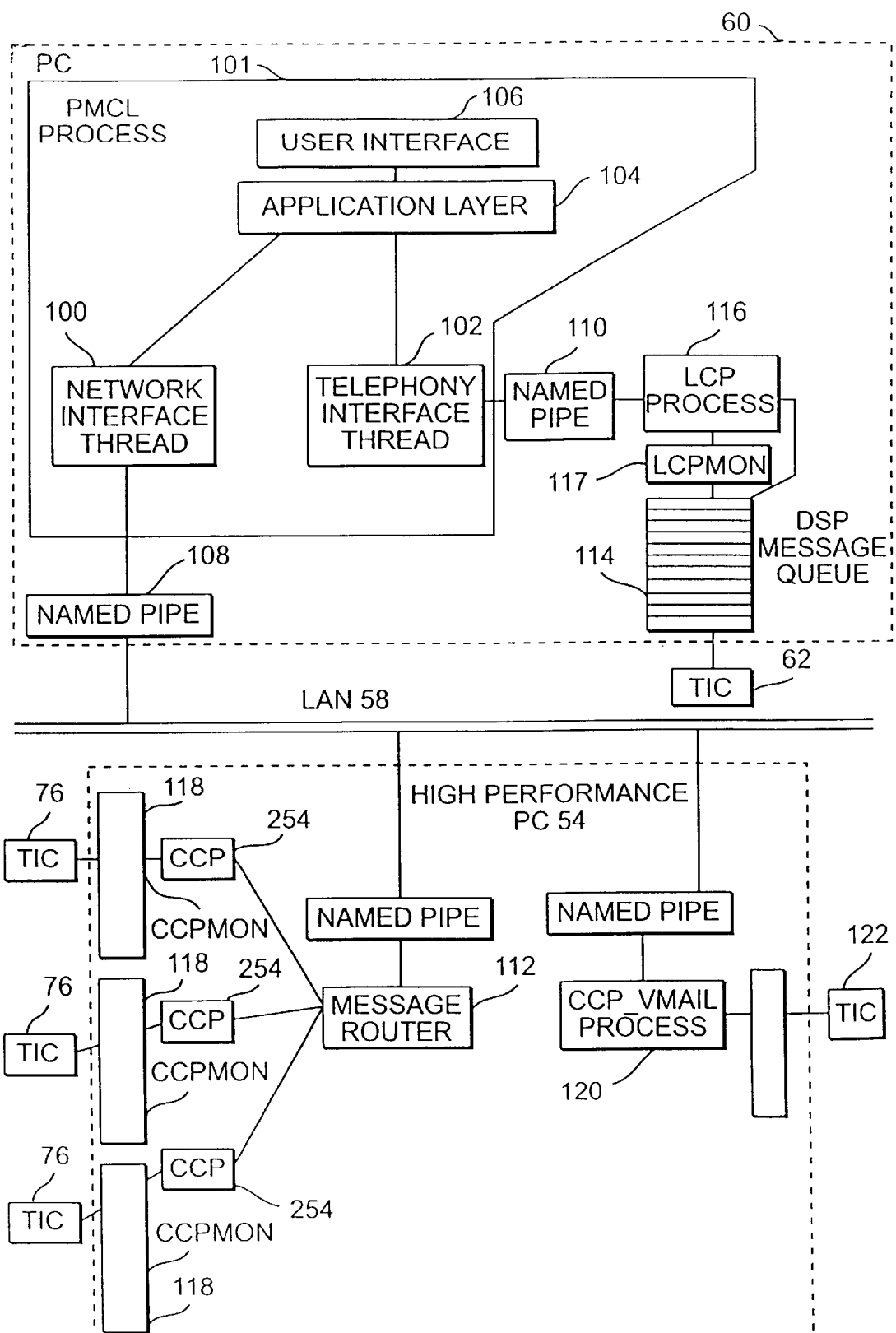
FIG. 2. shows a schematic of the software running on a PC and on the high performance PC in the embodiment of FIG. 1, and the communication links and other connections between the software modules of the system.

FIG. 2 shows the software running on each of the PCs 60 and on the high performance PC 54 in the embodiment illustrated in FIG. 1. The Presentation Manager Control (PMCL) process 101 includes functions for managing network and telephony communications. The network interface thread 100 controls the network interface card 64 of FIG. 1 and the telephony interface thread 102 sends messages to the LCP process 116 for control of the telephony interface card 62 of FIG. 1. The application layer 104 handles the transmission of messages between the user interface 106 and the network interface thread 100 and between the user interface 106 and telephony interface thread 102, and can include implementation specific software or formatting, organizing and collecting information from databases, or for creating messages for retrieving information from and storing information in the data base.

The user interface is preferably a graphical user interface and is more preferably a graphical user interface supporting multi-tasking. In one embodiment of the invention the graphical user interface is the Presentation Manager provided by the IBM OS/2 operating system, but those of ordinary skill in the art will know that other interfaces will also work with the present invention. Other interfaces are equally adaptable to the present invention, such as command-line interfaces, other kinds of graphical user interfaces including those providing mouse cursers or cursers controlled by key-strokes.

In some embodiments of the invention, one or more of the PCs 60 will not be used by an agent, but will instead run an application program that interacts directly with the caller's touch tones. On these PCs, a user interface is not necessary.

The device driver programs described above that control low level access to the network interface controller card 64 are a level below the network interface thread 100. In the embodiment under consideration, the network interface thread 100 is a thread created by the application layer 104. A thread is a child process that does not require initialization of system resources, such as memory and ports, during the thread's own initialization process. Instead, a thread can use the system resources of its parent process. The network interface thread 100 provides for communication to the other PCs 60 on the LAN 58, and provides each PC 60 with access to the information in the database maintained by the host computer 66. The network interface thread 100 sends and receives messages from the application layer 104 via shared memory and semaphores. For example, a semaphore is set when a message is to be sent to the application layer 104. The application layer 104 checks the state of this semaphore at certain points in its code. When the application layer 104 finds a semaphore that is set, it reads from a location in shared memory where the message is stored. When the application layer 104 sends messages to the network interface thread 100, the reverse action takes place, i.e., the application layer 104 sets a semaphore, and the network interface thread 100 responds to the semaphore by reading a message from shared memory. Other types of interprocess communication may also be employed. Preferred methods of interprocess communication are methods provided by operating system software such as the posting method provided by the OS/2 system. These methods shield the programmer from the details of interprocess communication.

The network interface thread 100 in one embodiment of the present invention has an OS/2 named pipe 108 that links network interface thread 100 and the message router, 112. The named pipe 108 allows interprocess communication in the OS/2 environment using standard file reading and writing routines. If an environment other than OS/2 is used for the practice of the present invention, persons of ordinary skill in the art will know equivalents for named pipes provided by those other environments for use in interprocess communication. The network interface thread 100 can communicate with other network interface threads running on the other PCs 60 on the LAN 58 and with call control processes (CCPs) 254 running on the high performance PC 54 through the named pipe 108 and the message router 112.

The LCP process 116 is, in the embodiment under consideration, an autonomous process running on each of the PCs 60. The LCP process 116 first initializes the telephony interface card 62 and then polls for messages from the application layer 104 via the telephony interface thread 102 and from the resident firmware and downloadable software running on the telephony interface card 62. The LCP process 116 performs all call control necessary to initiate, answer or transfer a call, such as flashing the switch hook, sensing a dial tone, sending touch tones and hanging up. Messages coming from the firmware and software on the telephony interface card 62 are checked for type and are preferably checked for errors. These messages may result in communication to the application layer 104 or may result in a response by the LCP process 116 itself. The LCP process 116 also polls for and receives messages from the application layer 104 which result in the LCP process 116 controlling the telephony interface card 62 to perform an activity such as hanging-up or sending touch tones. In the embodiment under consideration, the mode of the communication between the LCP process 116 and the telephony interface thread 102 is a named pipe 110. In the same embodiment, the mode of communications between the LCP process 116 and the telephony interface card 62 is a set of message queue commands supplied by Natural MicroSystems, the manufacturer of the telephony interface card 62, and resident on the telephony interface card 62.

In this embodiment, during its initialization the LCP process 116 downloads digital signal processor software onto the telephony interface card 62, opens a named pipe for establishing communications with the application layer 104, and waits for state changes on the telephone line connected to the telephony interface card 62 and for messages coming through the named pipe. The functions on the telephony interface controller card 62 provided by Natural MicroSystems create a message queue 114 between the digital signal processor (DSP) software and the LCP process 116. These functions also provide for the creation of a thread 117 for connecting the message queue to the telephony interface card 62 where it can be accessed by the digital signal processor software. The initialization portion of the LCP process 116 initiates creation of the thread 117 by passing a function pointer to the Natural MicroSystems software that creates the thread. The thread 117, called the Line Control Process Monitor (LCPMON), alternately reads from the named pipe 110, checks the digital signal processor message queue 114, and sleeps for 40 ms. Messages from the application layer 104 are received by the telephony interface thread 102 which writes them to the named pipe 110. If the LCPMON thread 117 receives a message from the named pipe 110, it converts it to a message in the format of the digital signal processor message queue 114, and puts the re-formatted message into the digital signal processor message queue 114, thus passing the message to the LCP process 116 which is waiting for messages from the LCPMON thread 117. If it encounters an incoming message on the DSP message queue 114, it moves the message to the top of the queue for reception by the LCP process 116.

In the embodiment under consideration, the LCP process 116 itself is a simple finite state machine that responds to messages appearing on the top of the digital signal processor message queue 114 in the context of its current state. For example, in one embodiment of the invention the telephony interface controller module 102 has two states: Idle and Answer. The receipt of an ONHOOK message during the Idle state is ignored, while the receipt of an ONHOOK message during the Answer state results in idling of the call and movement of the LCP process 116 to the Idle state. In other embodiments of the invention, the telephony interface controller module 102 can have additional states, such as Hold or Dial, or other states that are useful for specific implementations of the invention. For example, if the system of the invention is used for managing and executing financial transactions, a Transaction state could be provided. During the Transaction state, all requests to disconnect would be ignored, or held, until the transaction is completed.

In both the Idle and Answer states there are many digital signal processor message types. The five most important message types are as follows. The ONHOOK and OFF-HOOK message types are sent when the state of the line connecting the telephony interface card 62 to the PBX 50 changes from off to on hook or vice-versa. The LCLONHK and LCLOFFHK message types are sent when the user hangs up or answers the user's telephone. The RNGBEG message type indicates that the telephony interface card 62 has received a ringing current. The WM_XFERCALL and WM_DSCNNCT are message types that are sent by the application layer 104 in response to agent-initiated actions such as call transfer or disconnect. The minor message types comprise error messages which are handled by cleanup and reentering the Idle state. Cleanup includes re-initializing the local variables of the LCP process 116 and preparing the telephone line 52 and the extension line 74 for error recovery. For example, the LCP process 116 presents a long disconnect to the PBX 50 by calling a function to cause the telephony example, as in FIG. 3 and comprises a destination field 150, a source field 152 and a content field 154. The message router 112 reads and responds to the destination field of a message by sending the message to the named pipe 108 belonging to the network interface thread 100 indicated by the value stored in the destination field. Thus, each PC 60 needs only one network interface controller module 100 and only one named pipe 108 to communicate with all other PCs 60 on the LAN 58, but more named pipes may be provided for purposes known to those having ordinary skill in the art. The network interface thread 100 can send messages for broadcast to all network interface threads on the LAN 58 by sending a message of a special form, as will be discussed fully below.

In other embodiments of the invention, no message router 112 is unnecessary. In these embodiments, each network interface thread 100 has access to information providing a correlation between the network addresses of each PC 60 and the telephone extension numbers for each telephony interface card 62 and a correlation between the message ports for each CCP process 254 and its associated telephony interface card 76. One method of providing such access is for each PC 60's network interface threads 100 to broadcast to all network interface threads 100 at the time the system starts up the network address of its PC 60 and the extension number of its telephony interface card 62. Whenever a new PC 60 is added to the LAN 58, it will broadcast such a message, and each PC 60 already on the LAN 58 will also repeat its own message to the new PC. In this way each PC 60 knows how to route messages to other network interface threads 100.

Another method for implementing the system of the invention without a message router would be for all messages to be broadcast to all PCs 60 and the CCP processes 254 on the PCs 54. Each network interface thread 100 would then determine whether to process the message. Any other system for dispatching messages between processes may be used. There are many ways of implementing interprocess message dispatch systems known to those having ordinary skill in the art.

The interrelationship between the parts of PMCL process 101 is illustrated in FIG. 4. The top part of the application layer 104 is the group of routes called the PMCL routines 200. The first activity of the PMCL routines 200 is to initialize the network interface thread 100, the telephony interface thread 102 and the resources of the system used by the application layer 104. The PMCL routines 200 are the first point of control for all messages. Agent generated events such as mouse clicks and key strokes, and other events, such as the receipt of a network message, reach the PMCL routines 200 for processing. The PMCL routines 200 may handle the events themselves or pass messages on to other functions in the application layer 104. Below the PMCL routines 200 on the hierarchy of the application layer 104 is the group of routines called the Listbox routines 204. The Listbox routines 204 contain a variety of functions which aid in the processing of user interface activity and call control activity. Listbox functions help carry out the processing steps called by the PMCL routines 200. These functions may open and read files to populate data structures used by the PMCL routines 200, format messages and request them to be sent by the network interface process 102. Listbox functions may also create menus and handle responses from the agent during the menu context. The PMCL routines 200 and the Listbox routines 204 are parts of both the application layer 104 and the user interface layer. Below the Listbox routines 204 is Net thread (NETTHRD), the thread containing the network interface thread 100, and the telephony interface 102 (also called LCPTHRD), the thread for communicating with the LCP process 116.

The PMCL routines 200 starts with an initialization routine PMCL::HLWind( ) 206 which creates three semaphores and starts the NETTHRD, containing the network interface thread 100, starts the LCPTHRD 208, and starts a third thread, TMRTHRD. TMRTHRD serves as a timer by sending a message to the PMCL routines 200 once every second. The semaphores created by PMCL::HLWind( ) are called Printsem, sema1 and sema2. The Printsem semaphore is used for communication with the process that controls a printer. The sema1 and sema2 semaphores are used to communicate with the network interface thread 100 and telephony interface thread 102, respectively. Other semaphores can be added for communication with other processes as desired, such as a process to control a fax machine.

After initialization is complete, the PMCL routines 200 start two event handling routines: HLWind::MenuCommand( ) 212 and HLWind::Dispatch( ) 214. The HLWind::MenuCommand( ) event handler 212 responds to menu selections made by the user. Menu selections include requests to hangup the user's telephone line to the PBX, requests to answer an incoming call, requests to transfer a call to another PC on the LAN 58 and requests to accept a call being transferred. The HLWind::Dispatch( ) event handler 214 receives all messages from network interface thread 100 and the telephony interface thread 102. The HLWind::Dispatch( ) event handler 214 thus receives all messages from the LAN 58, since these are passed up by the network interface thread 100. The messages from the LAN 58 include messages for providing identification information about incoming callers, messages indicating that a transferred call is accepted and messages requesting the transfer of a call as well as other messages. The PMCL routines 200 also include routines for repainting the areas of the screen that are uncovered by user mouse action and routines that receive events and messages from other processes and make them accessible to the HLWind functions HLWind::MenuCommand( ) 212 and HLWind::Dispatch( ) 214.

The Listbox routines 204 contain, in the embodiment under consideration, the rest of the application layer 104. They handle all responses to user choices in the list boxes of the user interface. Activities of the Listbox routines 204 include, for example, responding to a user's selection of a caller by sending a message to the CCP process 254 currently controlling the call. This message causes the telephony interface card 76 to transfer the call. The Listbox routines 204 in this embodiment also maintains a timer, which is displayed, to track a call's stay in the queue.

In the embodiment of the invention under consideration, the Listbox routines 204 comprise the following routines. The routine ListBoxWind:.-ListBoxWind( ) 216 creates the data structures and window used for display of the list of callers, and initializes the timers. The routine ListBoxWind::ListBoxClk( ) 218 responds to a agent's selection from the list of callers by pulling the selected name out of the list and starting the agent's application program. The routine ListBoxWind::ListBoxXfer( ) 220 responds to a agent's request to transfer a call by bringing up a secondary menu containing a list of PC stations or direct dialing digits to which the call can be transferred. Responses to others of the agent's selections from this secondary menu are handled by ListBoxXfer::ListBoxClk( ) 218 which obtains the network address of the selected PC station, formats a transfer message containing the network address and sends the message to the network interface thread 100 for dispatching over the LAN 58 to the selected PC station. The Listbox routines 204 also include a routine for repainting the caller list when uncovered by user mouse picks, a routine for incrementing the timer maintained by the Listbox routines 204, a routine for adding or deleting callers from the list of callers, a routine that puts caller data into messages, and a routine that deletes a selected caller from the caller list.

If one of the named pipes 108 or 110 becomes damaged, for example, by corruption of its local memory, its owner process 100 or 102 simply closes the named pipe and reopens it. This action can be accomplished automatically by the named pipes' owner, or in response to a message sent by another process. For example, a system administration program running elsewhere on the LAN 58, such as on the supervisor PC 67, could send a kill and recreate message in response to a system administration's mouse click or keystroke. The named pipes 108 and 110 can be killed and recreated without starting their owners, the threads 100 and 102. This is accomplished by providing threads that can be initialized only once, End repeatedly re-entered to create the named pipes 108 and 110. This error recovery technique allows repair and recovery of a damaged element of the call distribution system, without requiring that the entire system be shut down.

The remainder of the application layer 104 includes routines that provide the interface between the call distribution system and application programs running on the PC 60. There are several types of these interfaces. In one example, the call distribution system creates a file containing information that is to be used by the application program and stores the file at a location accessible to the application program. When the user starts or enters the application program by actions such as a keystroke or a mouse click, the application program finds the file and processes and displays the information contained therein as appropriate. In another type of interface, the application program automatically polls for the presence of the file created by the call distribution system, and automatically brings up appropriate display screens, without waiting for user action. In a third type of interface, the application program and the call distribution system communicate directly by sending messages via interprocess communications. In a fourth type of interface, the application program could be a terminal emulation program which takes the received messages from the PMCL routines 200, and responds to fields in the messages as if they were keystrokes entered by an agent. Other methods of interprocess communication can be used as well.

FIG. 2 also illustrates the call management and message routing portions of the invention in the embodiment under consideration. The message router 112 is resident on the LAN 58 and receives and routes messages among the processes running on the PCs 60 and the high performance PC 54. In one embodiment of the invention, the message router 112 runs on the processor of the high performance PC 54. In other embodiments the message router 112 runs on the processor of the host computer or on another computer connected to the network. In an embodiment of the invention comprising multiple high performance PCs 54, the message router 112 can run on one of the high performance PCs. The CCP processes running on the other high performance PCs send messages to the message router 112 over the LAN 58.

The message router 112 consists of an initialization section followed by a message processing section. The initialization section links together all the named pipe communication channels 108 running on each of the PCs 60, and allocates an area of interprocessor shared memory for communication with other call control processes running on the processor of the high performance PC 54.

In one embodiment of the invention, the message processing section of the message router 112 is implemented as an infinite loop for checking each named pipe 108 and each shared memory location for messages followed by ms of sleep. If the message router 112 finds a message on one of the named pipes 108, it sends the message to the named pipe 108 indicated by the destination address field of the message. In the embodiment under consideration, the destination address is the telephone extension number of the destined agent. The telephone extension number maps to the ID of the named pipe 108 of the destination PC 60 or a CCP process 254 running on the PC 54, which the message router 112 uses to dispatch the message.

During the infinite loop, the message router 112 also checks each area of shared memory via semaphores. If the message router 112 finds a set semaphore, it processes the message from the high performance PC 54 found in shared memory. First the message router 112 converts the message into the format of the messages sent over the LAN 58. Then the message router 112 sends the message to the named pipe 108 indicated by the destination field of the message. The message router 112 routes messages from named pipes 108 to the high performance PC 54 by setting a semaphore and writing the message to shared memory.

Most messages are point-to-point, i.e., from one process to another. Some messages, however, require broadcast to all network interface processes 100 running on the PCs 60. For example, the messages WM ANS, which is sent when a user answers a call, and WM CALL, which is sent when a new incoming call is received, require this type of broadcast so that the lists of pending callers displayed on each PC 60 are accurate and up to date. The message router 112 includes a routine called MsgBrdCst( ) for broadcasting messages. The MsgBrdCst( ) routine loops through a list of named pipes 108 and sends the message to each named pipe 108 on the list, except for the named pipe 108 on the PC 60 that originated the message.

The other processes running on the high performance PC 54 are the call control processes (CCPs) 254. There is a separate CCP process 254 for each telephony interface card 76, but each CCP process 254 is a clone of an original CCP process. The structure of a CCP process 254 is very similar to the structure of an LCP process 116. Like the LCP process 116, the CCP process 254 has an initialization portion and a processing portion. Like the LCP process 116, the CCP processes 254 have an initialization portion that initializes a communications link to a digital signal processor comprising a digital signal processor message queue and a communication thread. The CCP processes 254 communication thread is called CCPMON( ) 118. The CCPMON( ) thread 118 communicates with the message router 112 via the shared memory and semaphores that were discussed above. In the embodiment under consideration, the CCP processes 254 all co-reside on the same computer 54; however, in other configurations, the CCP processes 254 can be distributed among different machines, as convenient. Each CCP process 254 should reside on the machine that is connected to the telephony interface card 76 that it controls.

Unlike the telephony interface processes 102, each CCP process 254 can also provide voice response capabilities to the telephone line connected to its telephony interface card 76. When the CCP process 254 completes its initialization phase, it sends voice messages to the caller and receives touch-tone input. The touch-tone responses usually result in application program or database access over the LAN 58. In other embodiments of the invention, the voice response functions can be handled by a separate process from the CCP process 254 itself. The CCP process 254 also handles call transfers to an operator, or entry of the calls into one or more call queues that are implemented by establishing one or more telephony interface cards having telephony connections to the PBX, which are solely for holding calls and do not provide voice response unit functionality. After the CCP process 254 has collected information from the caller, it can transfer the call to one of the holding telephony interface cards until an agent is available.

Queues are established in two ways: 1) The agent's call routines receive messages from the CCP processes 254 and order them based upon criteria such as type of call and age of other calls in the queue. 2) A central queue handler function keeps a table establishing the order for answers. In one embodiment of the invention, the first queue method is employed. The criteria for establishing the PC's queue discipline is obtained from a message called QUEUE_DISP. The QUEUE_DISP message originates from a supervisor PC 67 connected to the LAN 58, as illustrated in FIG. 1. The QUEUE_DISP message may be transmitted to individual PCs or to all PCs in the system via broadcast. The QUEUE_DISP message contains information to help the PCs 60 decide how to order the incoming new call messages they receive from the CCP processes 254. QUEUE_DISP may, for example, contain a sub field "REASON" which provides acceptance criteria for incoming calls. If, for example, "REASON" was set to "BUYER" in a message sent to one PC 60 and set to "SELLER" in a message sent to another PC 60 then incoming new call messages containing reasons equal to "BUYER" would only show up on the queue of the first PC 60. In this way the supervisor PC 67 has real time control of all stations, on a group or on an individual basis.

The supervisor PC 67 can also control the queuing call distribution method. For example, the QUEUE_DISP messages can contain "FORCED" as the reason. Forced distribution results in calls sent to the most idle agent. In this method, distribution of calls is done not by agents' selections at the agent work stations but automatically by the CCP process 254. A list is maintained of the agents who are idle and the amount of time they have been in this state. This list is maintained by the adjunct process ACD MIDLE running in the high performance PC 54. The ACD_MIDLE process uses the WM_DISC message to help establish this list. CCP processes 254 having received the QUEUE_DISP message with "REASON" set to "FORCED" consult the ACD MIDLE list through shared memory. If no agents are available the call must wait until CCPMON 118 finds a change in the semaphore ACD MIDLE SEM. When ACD MIDLE SEM is cleared by ACD MIDLE, CCPMON 118 may begin its transfer.

The CCP process 254 can also implement a queue by holding the calls at the telephony interface cards 76 until an agent is available to receive the call. The ability of the agent processes to maintain queues allows the system of this invention to operate sophisticated call management in conjunction with very simple PBXs, very simple key system groups, or with no PBX or key system group at all. When an agent answers a call in a queue, A WM_GOTANS message is sent to the CCP process 254 which is holding the call. The CCP process 254 then transfers the call by presenting a hook flash to the switching device and transfers the information obtained from the application program or database over the LAN 58 to the PC 60 that answered the call. The session of the application program running on the agent's PC can then use this information. The CCP process 254 then returns to the Idle state and is free to accept new calls again.

When calls are transferred in the analog switching environment the flash timing must be accurately controlled. Analog call transfers typically require a 500 ms onhook condition to be present on the line before secondary dial tone is presented. This hook flash time must be within the tolerances of the switching system to which the telephony interface card 76 is interfaced. These tolerances vary slightly from manufacturer to manufacturer. Flash timing may also vary as a function of the load of traffic on the switch. In times of high traffic the flash may need to be present longer than 500 ms to be accepted by the switch.

In order to make adjustments to the flash timing a field FLASH TIME is defined in the WM_CALL message. FLASH TIME is filled in by the CCP process 254. The CCP process 254 determines the value of FLASH TIME based on the number of calls in the queue. This number is available in the global system variable Num_in_queue. Num_in_queue is incremented by a CCP process 254 whenever a new call reaches the CCP process's telephony interface card 76 and documented whenever a call is transferred from the CCP process's telephony interface card 76. Num_in_queue is compared against a pragmatically defined equation to determine the Flash time value. For instance, a particular PBX may require standard 500 ms flash timing except under 80% or greater load. At that load the average flash time jumps to 600 ms. If the maximum value of Num_in_queue is 100 then when Num_in_queue exceeds 79 the value of Flash time would become 600 ms. Because Flash time is part of WM CALL, the entire system can adjust very quickly to switch load.

It is important, also, to ensure calls transferred from the CCP process 254 reach their destination agent's telephony interface card 62. The highest level of control and assurance over this transfer can be achieved by sending and receiving transfer assurance tone (TAT). When each CCP process 254 is initialized it contains a defined variable in memory which contains a unique value. For example, the variable "extension" contains the extension number to which the CCP process's 254 telephony interface card 76 is connected. "Extension" is used to select a unique frequency from a table called ext to freq. This frequency is used by the CCP process 254 to generate a tone after the flash and dialed digits of a call transfer. This frequency is also used by the LCP process 116 of the agent receiving the call. The LCP process 116 is passed the value of this frequency in the WM ANS message. The LCP process 116 waits for RNGBEG, answers, and then listens for the TAT. TAT is sent by the CCP process 254 and received during the first 250 ms after answer by the LCP process 116. The agent does not hear this tone because the headset connection is muted until after the TAT is removed from the line.

Reception of valid TAT by the LCP process 116 provides an additional criteria for accepting the call and additional assurance that the data and voice stay linked. Once TAT is received and validated by the agent LCP process 116 a message (WM_GOTTAT) is sent to the CCP process 254 to finish the transfer (i.e., the CCP process 254 disconnects). If during this interval the CCP process 254 receives busy tone then it will flash to end this transfer attempt and end a WM CALL REJ to the agent. This gives the agent an opportunity to re-select this caller from the queue. Receipt of an invalid TAT or no TAT results in a WM TAT NAK message sent to the CCP process 254. If the CCP process 254 receives a WM_TAT_NAK message it may take appropriate action such as abandoning the transfer and reissuing the call to the queue.

Transferred calls in some key system groups differ from this scenario. In the key system group scenario the recipient party must dial a pick-up code and a trunk ID number. In this case the recipient party is told which trunk to pick up in the WM XFERCALL message.

The system of the embodiment under consideration is intended to run indefinitely once it is started, and only needs to be shut down for hardware maintenance, maintenance of operating system software, or major reconfigurations of the call distribution system itself. Other changes, such as changes to the application program running on the host computer 66 or adding or removing PCs 60 or high performance PCs 54 in some configurations, do not require shutting down and restarting the call distribution system.

The initialization process of the embodiment of the invention under consideration begins with the initialization of the CCP router module 112. The next phase of initialization includes the start up of the PMCL routines 101 running on each of the PCs 60. During this phase of initialization, the network interface threads 100 are started and create the named pipes 108 for communication over the LAN 58. During the last phase of initialization, the CCP processes 254 are started. After initialization is complete, the call distribution system is ready to receive and distribute calls and information as described above.

Another application of the invention is to provide remote voice mail access and control. When callers leave a voice mail message for an agent a WM VMAIL CALL message is sent from a CCP_VMAIL process 120 operating on a computer connected to the LAN 58 that handles voice mail to the agent through the message router 112. For example, in one embodiment, the CCP_VMAIL process 120 operates on the high performance PC 54, as illustrated in FIG. 2. The WM_VMAIL_CALL message is received by the agent's PMCL routines 101 which prints a message on the screen of the agent's work station informing the agent of the presence of the Voice Mail message. The agent may click on the VM menu item of the user interface and begin a session with the Voice Mail device.

When VM is selected, the PMCL process 101 receives an internal WM_VMAIL message. This message is passed to the LCP process 116 where an outgoing call is placed to the extension of the voice mail where it is answered by a telephony interface card 122 associated with the CCP_VMAIL process 120. The extension is a parameter stored in a file and is changeable, like all extension numbers, from site to site. Another version of the WM_VMAIL message is formatted by the PMCL process 101 and sent to the CCP_VMAIL process 120. If the CCP_VMAIL process 120 receives a WM_VMAIL message it begins its control dialogue via message passing with the agent over the network 58. If no WM_VMAIL message is received it begins its control dialogue using touch tones.

The agent can listen, play, record, delete, or perform any operation on the voice mail by clicking on menu items in the user interface. When VM is selected, LIST::ListBoxVMail( ) is called by the PMCL routines 200. LIST::ListBoxVMail( ) creates a Listbox containing PLAY_MESSAGE, DELETE_MESSAGE, RECORD_MESSAGE, and END_SESSION. When one of these is selected by the agent a WM_VMAIL message is formatted. One of the fields of the WM_VMAIL message is the "action" field. "Action" tells the CCP_VMAIL process 120 what action to take (play, delete, etc). When an agent has finished his or her session, END_SESSION is selected. A WM_VMAIL message is sent to the CCP_VMAIL process with action set to END_SESSION. Another copy of this message is sent to the agent's LCP process 116 for disconnect.

The system can also provide for operations such as predictive dialing. Predictive dialing is a method of contacting customers comprising outward dialing initially under computer control. If a call results in a busy signal or no answer the computer tries to contact another customer. If a call is answered, the call is transferred to an available agent. The call distribution system of the invention can provide for predictive dialing by providing for the message router 112 to route information regarding the state of agent's phones to a predictive dialing application program resident on the network 58. The application makes outside calls via a telephony interface card under its control. The application program will only place outside calls when there is at least one open agent telephone. When the application program reaches a customer, it transfers the call to an available agent via its telephony interface card and the PBX that is connected to the application program's telephony interface card and the agent's line. At the same time, the application program sends information about the customer to the agent's PC via the message router 112 and the network 58.

Figure 5:
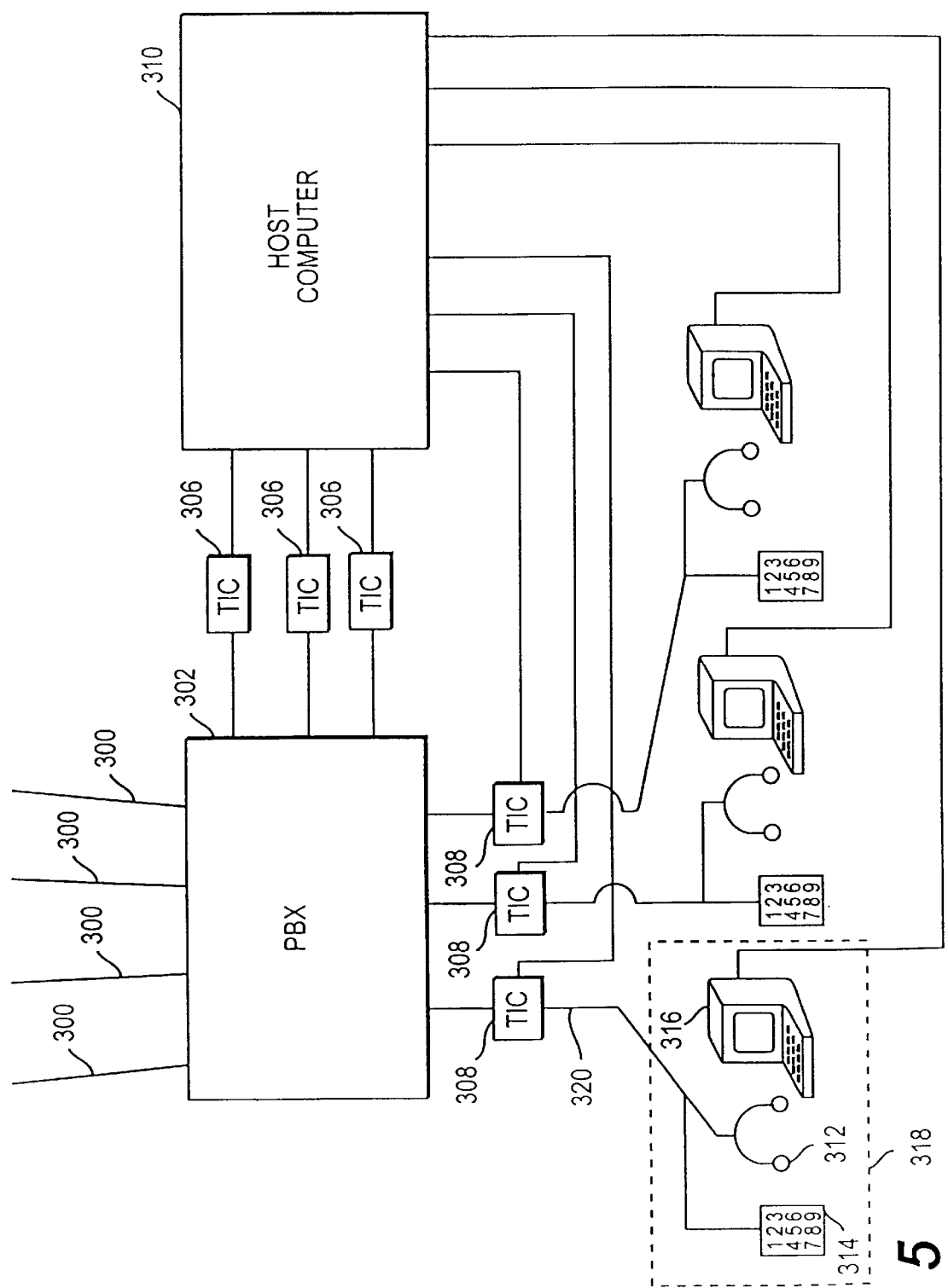
FIG. 5 shows a schematic of a second embodiment of the call distribution system of the invention and shows the hardware connections between the components of the system.
Figure 6:
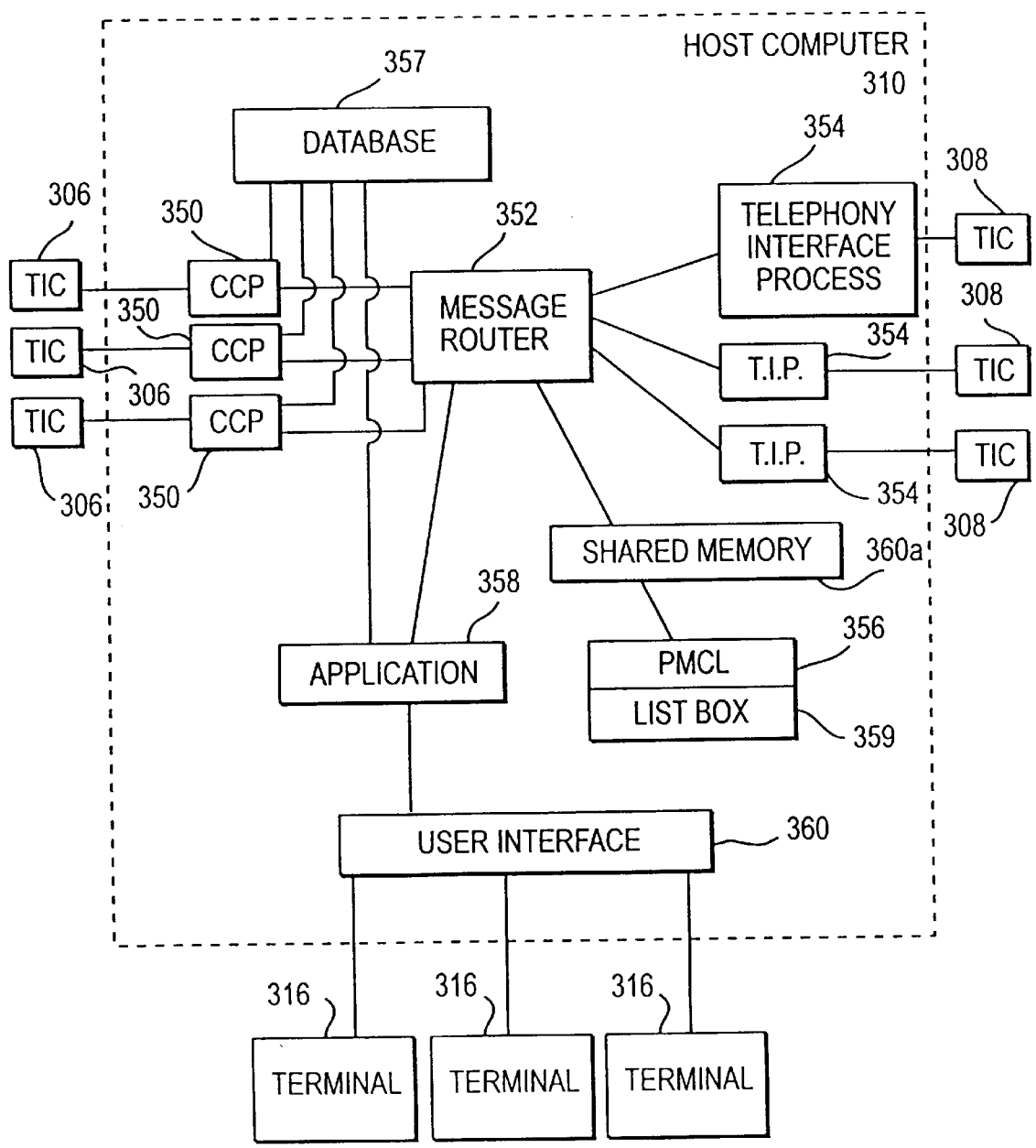
FIG. 6 shows a schematic of the software processes of the second embodiment of the invention and shows the communication links and other connections between the processes of the system.

In another embodiment of the invention, the call distribution system is implemented without a network as illustrated in FIG. 5. The software used in this embodiment is illustrated in FIG. 6. In this embodiment, the incoming telephone lines 300 are received by the PBX 302. The PBX 302 initially connects incoming calls with the telephony interface cards 306, which are under the control of the CCP processes 350 running on the host computer 310. The CCP processes 350 send audible voice messages to the callers and receive digit responses from the callers through the telephone interface cards 306. The CCP processes 350 use the callers' digit responses to access pertinent information from the database 356. When the call is ready to be transferred to an agent's station 318, the CCP process 350 sends a message to the message router 352.

The message router 352 maintains an internal table describing the current state of each of the agent's telephone lines 320. In other embodiments, the functionality of the message router is limited to dispatching messages from one process to another. The message router 352 obtains the information for building this internal table from the telephone interface processes 354, which are autonomous processes running on the host computer 310 and which control the agent's lines 320. Whenever a telephony interface process 354 changes the state of the agent's telephone line 320, the telephone interface process 354 sends a message describing the new state of the line 320 to the message router 352. Each telephony interface process 354 controls an agent's line 320 via a telephony interface card 308 connected to the PBX 302 with a telephone line configured according to analog protocols. Digital protocols, such as proprietary protocols or ISDN, can also be used. This is also true of the telephony interface device 306 where even T1 might be appropriate. The telephony interface card 308 is a device such as the telephony interface cards 62 and 76 described above in connection with the first embodiment. The interface between the telephony interface process 354 and the telephony interface card 308 is a digital signal processor message queue, as described above in connection with the first embodiment. The message router 352 and the telephony interface process 354 receive messages from the agents via the presentation manager control (PMCL) process 356 and the Listbox routines 359. The types of messages include a message indicating the agent is ready to receive calls, a message indicating the agent will answer a proffered call, requests to transfer a call, accepting a transferred call, requests for information from the database 357 and others. The agent sends a message by pressing the return key while the cursor is over the appropriate item in the user interface 360. The key press and cursor location are sent to the Listbox routines 359 via an event queue maintained by the operating system of the host computer 310. The Listbox routines 359 use this information to determine what kind of message to send, and passes the agent's station location and an identification of the message to the PMCL process 356. The PMCL process 356 then formats the message and sends it to the message router 352 via shared memory 360, or a similar interprocess communication mechanism provided by the operating system running on the host computer 310. If the message is a request by the agent to make or terminate a call, or a request for some other change in the state of the agent's line 320 that can be initiated by the telephony interface card 08, the PMCL process 356 also sends the message to the telephony interface process 354, which passes the message along to the telephony interface card 308 via the DSP message queue as described above. If the message is an acceptance of a proffered call, the message router 352 sends a message to the CCP process 350 that is holding the call requesting that the CCP process 350 transfer the call to the agent's telephony interface card 308. The CCP process 350 accomplishes this act by posting a transfer message on the DSP message queue, which it shares with the telephony interface card 306. When the telephony interface card 306 receives the transfer message, it transfers the call using the flash and dialed digit transfer facility provided by the PBX 302. When the agent receives the call it can communicate with the caller via the agent's headset 312.

At the same time as the agent receives the call via its line 320, the agent can also view database information on its terminal 316. The database information will be specifically associated with the caller or the purpose of the call. For example, if the call relates to a bank loan, the database information will comprise current interest rates as well as credit information on the caller. The database information was acquired by the CCP process 350 and was sent to the message router 352 during the time the CCP process 350 processes of the transfer message. The message router 352 then sends the database information to the application 358 which formats the information for display and displays the information on the terminal 318.

Figure 7:
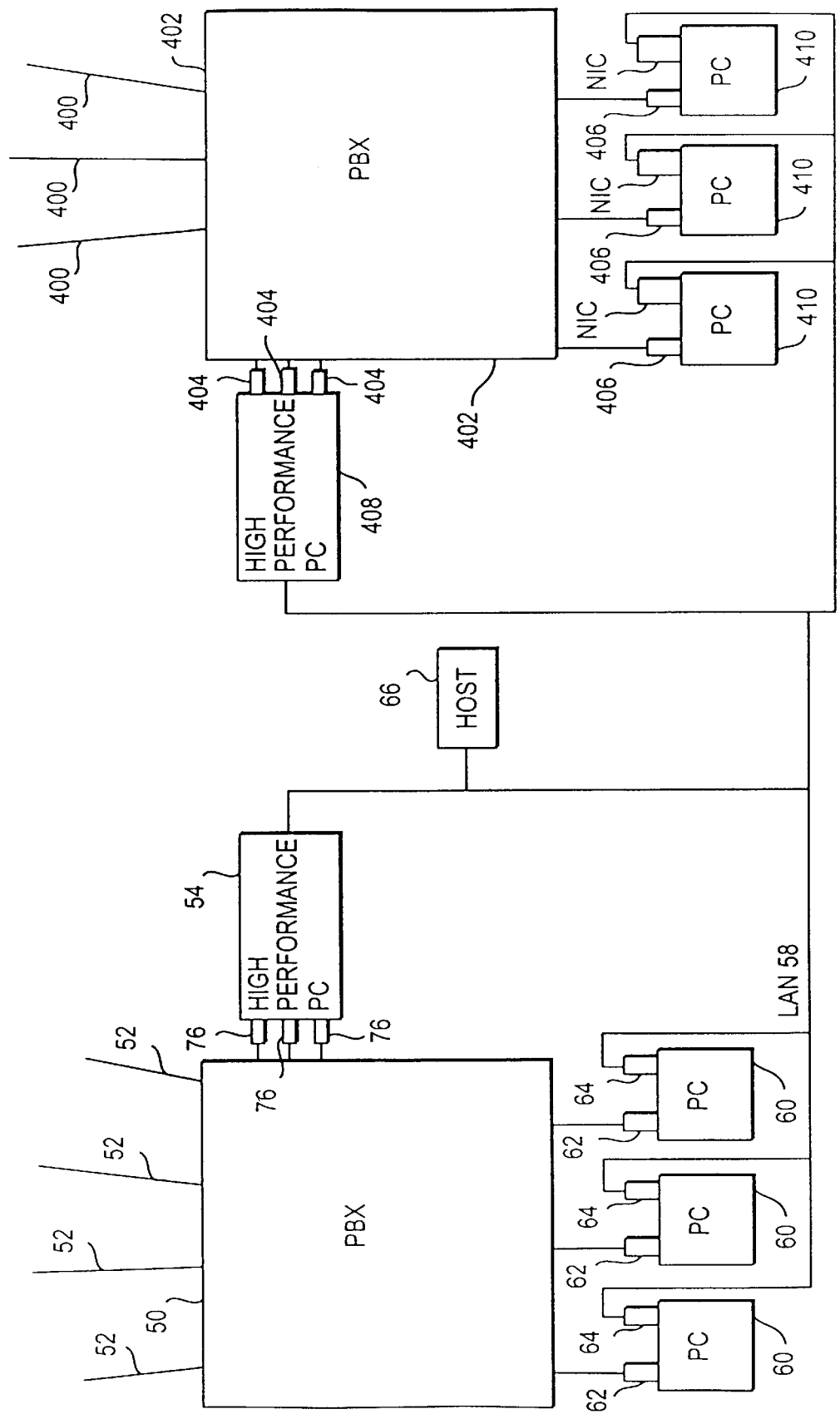
FIG. 7 shows a schematic of an embodiment of the invention comprising multiple PBXs and shows the hardware connections between the components of the system.

FIG. 7 shows another embodiment of the invention that includes the elements of the system of the first embodiment described above, as well as a second set of incoming telephone lines 400 that are serviced by a second PBX 402. The telephony interface cards 404 and 406, like the telephone interface cards 62 and 76 described in connection with the first embodiment, perform telephony functions such as making calls, receiving calls, and transferring calls. The telephony interface cards 402 are connected to a computer 408 that runs call control processes (CCPs) which are clones of the call control processes 254 running on the high performance PC 54. The computer 408 is also connected to the LAN 58, and the call control processes running on the computer 408 send messages over the LAN 58 to the message router 112 running on the high performance PC 54. Thus it can be seen that the message router 112 can run on any computer connected to the LAN 58 provided it can send messages to and receive messages from all call control processes 254, and all network interface threads 100. The embodiment of the invention shown in FIG. 7 is also provided with PCs 410, each connected to the LAN 58 and each having telephony interface cards 406 as in the case of the PCs 60 associated with the first PBX 50. Using this embodiment of the invention, an establishment having multiple PBX's can use the call distribution system of the invention not only to provide the information stored on the host computer 66 to the PCs 410 running on the second PBX 402 but at the same time to transfer calls received Dyer the telephone lines 52 to the agents using the PCs 410. Furthermore, an establishment having multiple PBX's but no tie trunks connecting them together can nevertheless integrate its entire telephone system as well as its information and data resources. The PBX 402 could be replaced by an automatic call distributor (ACD) provided the CCP processes running on the computer 408 anticipate the operation of the ACD's internal call distribution software when the CCP processes transfer or otherwise process a call.

Figure 8:
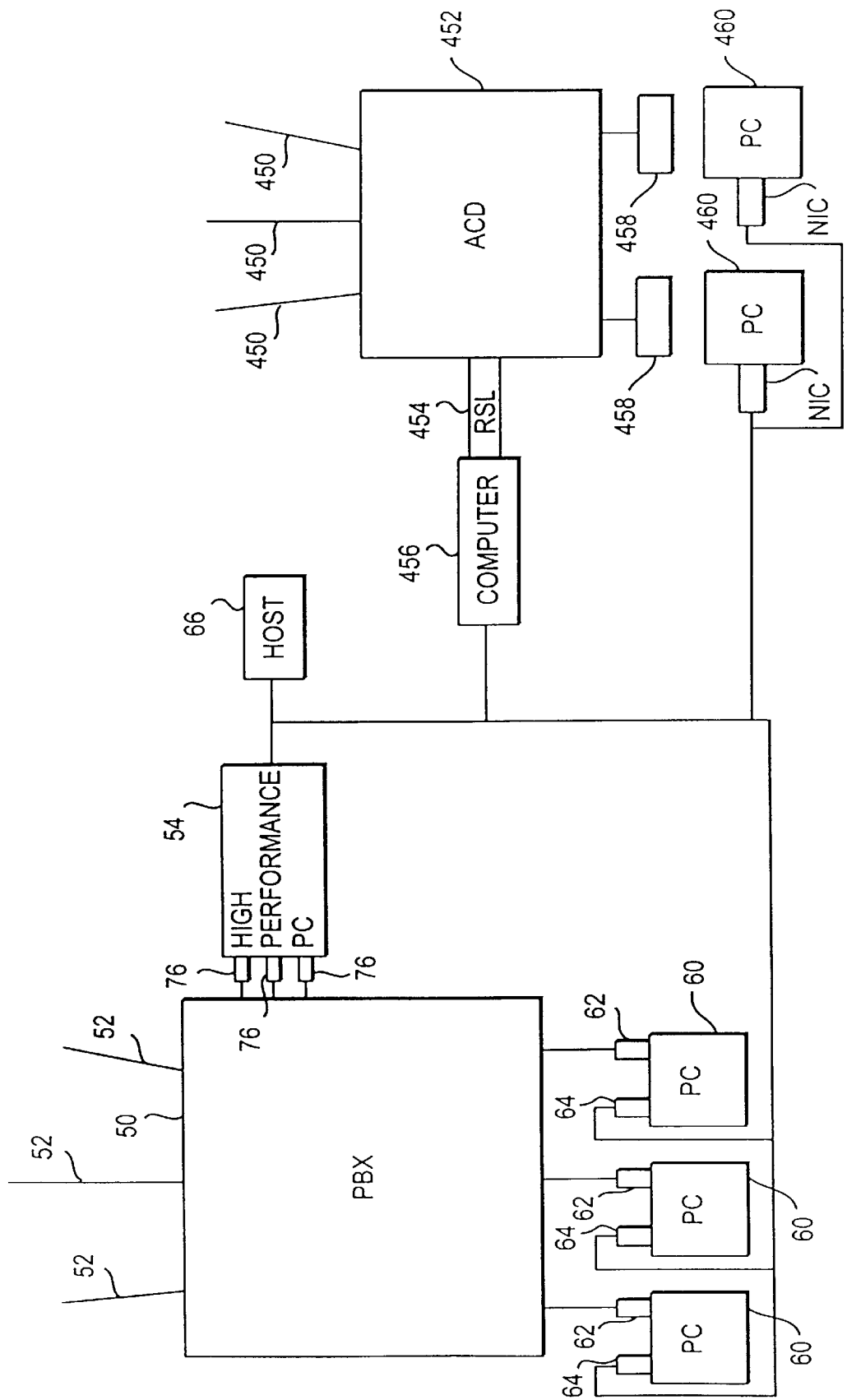
FIG. 8 shows a schematic of an embodiment of the invention comprising multiple ACDs and including an ACD employing an RSL, and shows the hardware connections between the components of the system.

The embodiment of the invention shown in FIG. 8 is similar to the embodiment of FIG. 7. However, it illustrates how the call distribution system of the present invention can easily and effectively incorporate complicated telephone systems such as those using RSL links. The incoming telephone lines 450 are received by the automatic call distributor 452. The computer 456 controls the distribution of incoming calls through the RSL 454. However, no reconfiguration of the application programs running on the host computer 66 is necessary. The message router 112, running on the high performance PC 54 provides the function of transferring the database information over the LAN 58 to an agent's personal computer 460. Simultaneously with its transfer of database information, the message router module 112 sends a message to the computer 456 requesting that it control the RSL 454 to effect a transfer of the call to the agent's telephone station equipment 458.

In one embodiment of the invention using a PBX and an ACD with an RSL connection, calls in the ACD's call queue are controlled by the CCP_ACD process. This process is similar in function to the CCP processes running on the high performance PCs, but it does not include the voice response activities of the CCP processes. The CCP ACD process receives and sends control information to the ACD 452 over its RSL link 454 instead of controlling a telephony interface card. Any voice response functions take place before control of the call is passed to the CCP_ACD process by the CCP process (which occurs when WM_CALL is issued by the CCP). At that time the CCP process transfers the call into the ACD 452 and sends WM CALL to its associated CCP ACD process.

Between the CCP_ACD processes and the RSL link 454 is a process called RSL_SERV. The RSL_SERV process receives messages from the CCP_ACD processes, converts these messages to the RSL format, and handles the transmission protocol over the RSL link 454. The RSL_SERV process also keeps a table containing associations between callers in the ACD 452 and each CCP ACD process. In this way the control of the ACD 452 via the RSL link 454 is treated as if a telephony interface card were used, and the operation of the CCP ACD process can be the same as the CCP processes 254 running on the high performance PC 54.

Agent work stations associated with the ACD 452 do not contain telephony interface cards. Their control messages are sent via their named pipes to a LCP ACD process. In one embodiment of the invention the LCP_ACD processes reside on the computer 456 with the RSL_SERV process. The RSL_SERV process performs the same functions for the LCP_ACD process as it does for the CCP_ACD process. Throughout the system, the same message types are used to control the call processing. This makes it possible to interwork with agent work stations on other switching devices and on other parts of the network.

The present invention provides a call center with the ability to blend multiple forms of communication for consolidated presentation to the agents responsible for handling such communications in the call center. The forms of communication that are blended include, but are not limited to, inbound calls, outbound calls, e-mail messages, and fax transmissions. As would be apparent to those skilled in the art, any form of communication that can be reduced to a computer usable form can be blending using the teaching of the present invention.

Call Blending is a term for mixing inbound and outbound calls in the same call center. There are two basic paradigms for blending inbound and outbound calls: "block" blending and "call-by-call" blending. Block blending reallocates agents in blocks of time from processing inbound calls to processing outbound calls as needed. That is, block blending moves agents from one dedicated activity, processing inbound call queues, to another dedicated activity, processing outbound calls. The net effect for the call center is call blending because the agents process inbound calls in one block of time and outbound calls in another block of time.

As can be seen from the above description however, there is an inefficiency inherent in the block blending paradigm of call blending. The inefficiency results because moving agents by blocks of time always requires some adherence to the scheduling intervals chosen to avoid thrashing, i.e., agents being switched consecutively between inbound and outbound call processing in an uncontrolled fashion. This adherence results in "windows" of inefficiency since agents are artificially held to perform a specific task because of the need to adhere to the chosen schedule, rather than perform other useful work during idle periods. Due to this inefficiency, the second type of call blending, call-by-call blending is more efficient.

Call-by-wall blending allows agents to process calls, whether inbound or outbound, without requiring time block allocation of the agents for processing inbound calls during one period and outbound calls during another period. Because of its better statistical efficiency model, call-by-call blending is used in the preferred embodiment.

Figure 9:
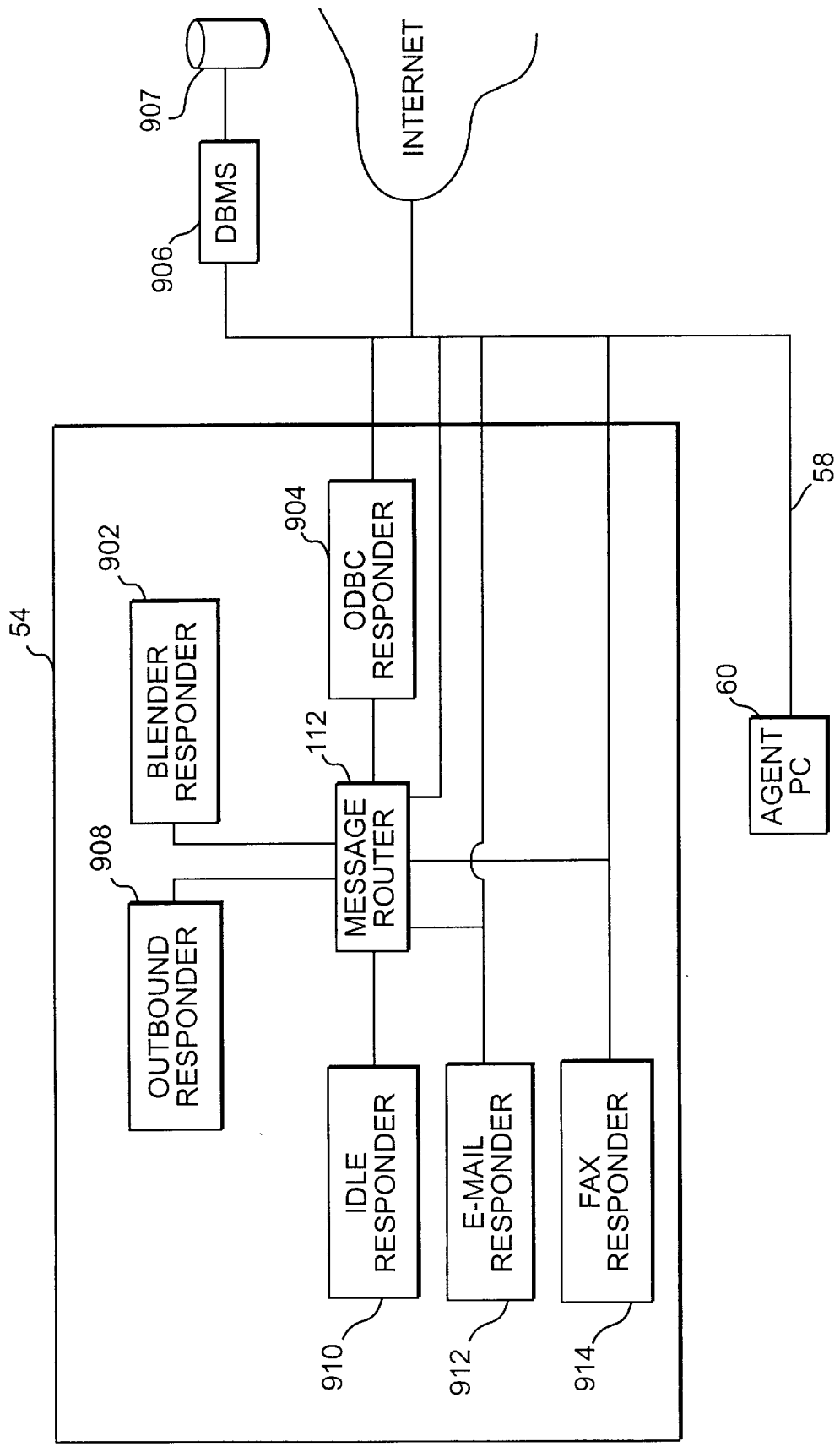
FIG. 9 shows a schematic of an embodiment of the invention for blending various types of communications including inbound calls, outbound calls, e-mail "calls" and facsimile (fax) "calls."

Call-by-call blending according to a preferred embodiment of the present invention is described with respect to FIG. 9. As described above, an agent, seated at a PC 60 sees calls that appear in a queue list that is displayed on a display device associated with the PC 60. In the preferred embodiment, the calls appearing in the queue list can correspond generally to inbound or outbound calls. According to the present invention, the agent preferably chooses inbound calls from the list until the list is idle. When a call is terminated, agent software, executing on the PC 60, checks the queue list. Call termination can be detected by the LCP process 116 by detection of an on-hook condition, or by detection of a DONE button being clicked by the agent.

If the queue list is empty, indicating an idle queue list, the agent software causes the PC 60 to send an outbound request message to a "Blender" responder process 902. In the preferred embodiment, the outbound request message is sent via the message router 112. Upon receipt of the outbound request message, the Blender responder 902 performs an SQL query of database 907 via database management system 906 to obtain an outbound call.

Figure 10:
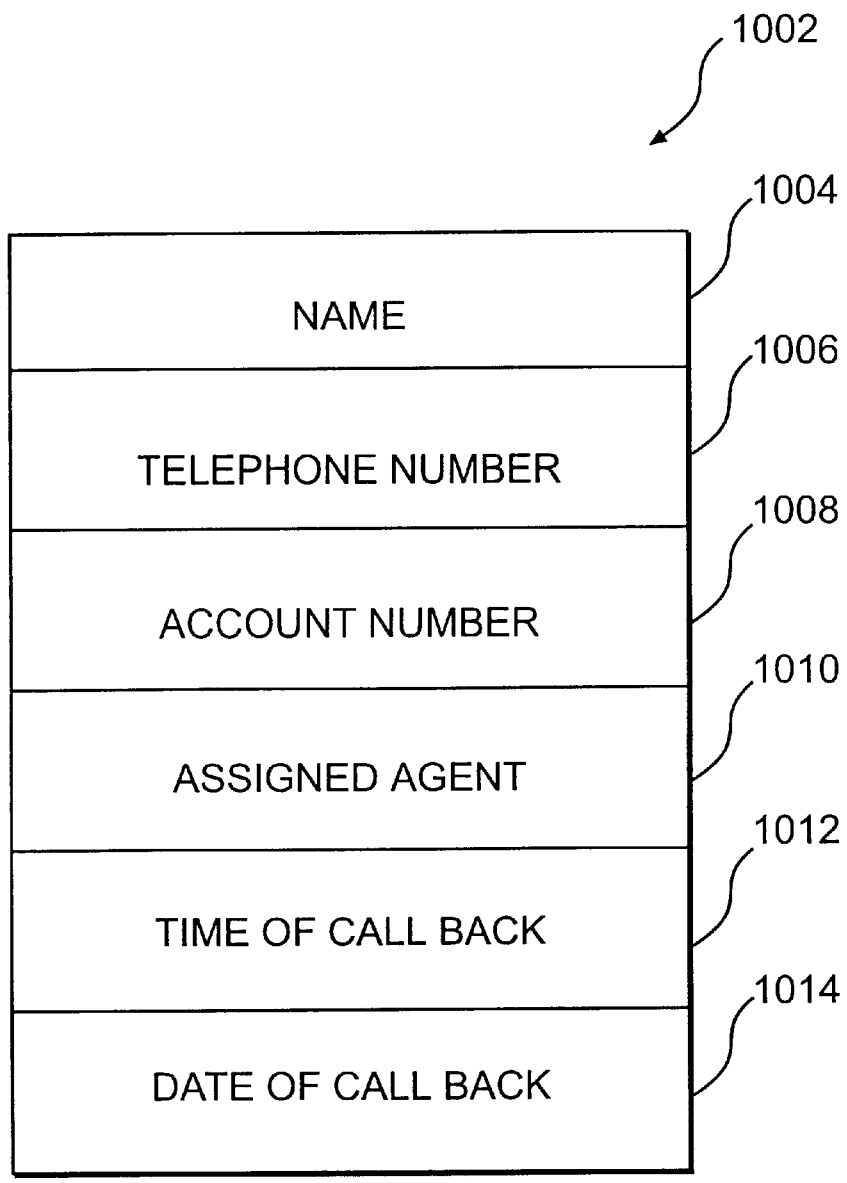
FIG. 10 illustrates an example data record that can be returned from a query of the database for an outbound call.

Outbound calls can be stored in the database 907 for various reasons, including a caller's desired to be called back and the system's marking a call for call-back because a caller terminated a call prior to its being processed by an agent. According to the preferred embodiment, the Blender responder 902 sends a message to a database responder 904 requesting an SQL query be made by the database management system 906. The database responder 904 causes the database management system 906 to perform the database query of the database 907. The database responder 904 passes the result of the query back to the Blender responder 902 in a RESPONSE message via the message router 112. The value returned in the RESPONSE message can be no match or the value of the first match from the query or some error code. FIG. 10 illustrates the information that can be returned in the RESPONSE message.

Referring to FIG. 10 illustrates an example RESPONSE message entry 1002 that can be returned in a RESPONSE message. Entry 1002 contains information that corresponds to an outbound call. In a preferred embodiment of the present invention, the entry 1002 includes a name field 1004, a telephone number field 1006, an account number 1008, an assigned agent field 1010, a time of call back field 1012, and a date of call back filed 1014. The name field 1004 contains the identity of the party to whom the outbound call is to be placed. The telephone number field 1006 contains the telephone directory number corresponding to the party to which the outbound call is to be placed. The account number field 1008 contains the account number used by the business in which the call center operates to identify the party to whom the outbound call is to be placed. The assigned agent field 1010 contains the identity of the agent responsible for handling the outbound call. The time of call back field 1012 contains the time that the outbound call is placed. The date of call back filed 1014 contains the date on which the outbound call is placed.

It would be apparent to those skilled in the art that other fields can be added or the fields shown can be removed to fit the needs of the particular call center using the present invention. For example, a field corresponding to the agent that should handle a call can be included in the RESPONSE message entry 1002. Moreover, fields corresponding to the date and time that an outbound call should be placed can be included in the entry 1002.

It is possible that more than one database record is returned in response to a particular database query. According to the preferred embodiment of the present invention, the first such database record is used to create the RESPONSE message entry. It would be apparent to those skilled in the art that more "intelligent" selection schemes are possible for choosing a particular database record from among the many that may be returned in response to a typical database query.

This database query may be multi-tiered. For example, a first query may be specific to the particular agent for which the outbound call is to be made. If, however, no outbound call results, information related to the particular agent may be omitted from the query. In that event, a more general outbound call query can be made to the database management system 906. Other factors that can be used in the multi-tiered query include time of day and day of year information. A system designed according to the preferred embodiment can script the blender responder 902 reflect the query process best matching the needs of the user of the system.

When database query resulting in a match is obtained, the database responder 904 sends a RESPONSE message to the Blender responder 902. The Blender responder 902 forms and sends an OUTBOUND message back to the PC 60. The OUTBOUND message indicates to the PC 60 that an outbound call will be placed for it. In addition, the blender responder 902 sends an UPDATE message to the ODBC responder 904. The UPDATE message causes the ODBC responder 904 to set the corresponding database entry to inactive. By setting the corresponding database entry to inactive, no other agent can dial the same call.

The Blender responder 902 is written so as to stack its requests for service. The blender responder 902 only processes the next request on the stack after it receives an UPDATE request from the database responder 904. By stacking outbound requests in this manner, the blender responder 902 assures that two PCs 60 will not attempt to perform the same outbound call. In the event that no outbound query responding with a match was obtained from the database responder 904, the Blender responder 902 receives a no match result in the RESPONSE message and takes the next request from its stack.

The PC 60 presents the OUTBOUND message containing caller information such as caller name, account number, etc., to its associated agent as a new call in the queue list. The agent can select this call from the queue list. In an alternative embodiment, the agent software selects the call through the FORCE mode feature of the present invention as described above. In either case, the PC 60 sends a BLENDED_ORIG message to the system to track the dial event. If the PC 60 has a PC voice card resident, the agent software dials the number via control of a telephone interface card in the PC 60. If the PC 60 has no PC voice card resident, an Outbound responder 908 process, upon receipt of the BLENDED_ORIG message, dials the call and subsequently causes the call to be transferred to the agent associated with the PC 60. Thus, the Outbound responder 908 process is used when agents do not have workstations with PC voice cards resident.

Predictive dialing methods can be mated to the blending technology described above. Such mating can result in incremental benefit where the characteristics of the call traffic and call center warrant such a mating. Blending calls with predictive dialing requires an more sophisticated Outbound responder 908. Moreover, in a system that mates predictive dialing with call blending, the blender responder 902 triggers not on the idleness of the agent but on the impending idleness of the agent.

According to the preferred embodiment of the present invention, an Idle responder 910 is used to determine the trigger event for appropriately dialing the next outbound call in the Blender responder 902 stack. The Idle responder 910 tracks characteristics of all calls in progress to predict when the next agent will become idle. Using the prediction, the Idle responder 910 can initiate dialing a call so that the call will be complete to its destination when the next agent becomes idle. Predictive algorithms to perform such tracking are well known in the art.

When the Idle responder 910 determines that a call should be initiated, it requests an outbound call by sending a message to the Blender responder 902. The Blender responder 902 selects a call to be dialed as described above and passes a message, via the message router 112, containing the number to be dialed to the Outbound responder 908. Note that, in the preferred embodiment, an agent level query cannot be performed in this mode since it is not known which agent will become available. The Outbound responder 908 dials the number contained in the message sent by the Blender responder 902. If the Outbound responder 908 fails to make a connection it passes a request message back to the Blender via the message router 112. The request message directs the Blender responder 902 to put the failed call at the bottom of the queue list and to query the database for an outbound number for dialing. This is an example of well known list management outbound dialing which is used to edit dial lists appropriately. This process continues back and forth until a call is successfully completed. Once a call is successfully completed the call is transferred to an available agent.

When the present invention is mated with predictive dialing, the Outbound responder 908 must not only dial a call but it must also "listen" for the disposition. That is, the Outbound responder 908 must determine whether calls are successfully completed or unsuccessfully completed, as for example, completed to an answering machine. Methods of monitoring for successful call completion are well known in the art. For example, "energy" sensing from a voice card, combined with timing intervals, can be used to differentiate real answers from answering machines or call progress tones in the network in a well known manner.

Upon completion of the outbound call, its disposition is determined by use of the wrap up features available in the present invention. The wrap up features of the present invention determine the next step in processing for the caller. For instance, the wrap up may change the database entry for re-dial where the caller party asked to be called back prior to terminating the call. Wrap up features in addition to call back include sending a confirmation letter of the call to the caller and sending a fax note to the caller.

In addition to call blending, the present invention can perform e-mail blending. Because e-mail is an important potential source of customer interaction in a call center environment, e-mail blending can be a significant concern. The manager of a call center needs to control and manage e-mail interactions in the same way voice calls are managed.

The agent of the call center can be more productive if e-mails are blended with the voice calls they receive. Agents can multitask their time if e-mails are presented for handling by agent software running on the agent's PC 60.

Referring to FIG. 9, to blend e-mail, an E-Mail responder process 912 is created to interface with e-mail sources. In one embodiment the E-Mail responder is written to interface with the POP protocol of the Internet. POP e-mail messages are sent to the E-Mail responder 912. When the E-mail responder 912 receives an e-mail message, it reads the e-mail message, processes it, and dispatches ANNOUNCE messages with an E-Mail call type. The message is dispatched over the message router 112 to the agents in the call center. When the agent's PCs 60 receive the ANNOUNCE message, each agent's PC 60 displays information concerning the E-mail, if the particular agent processes e-mail messages, in its queue list, as described above for voice calls. When an agent selects an e-mail "call" from the agent's queue, the agent's PC 60 opens the agent's e-mail reader. According to the preferred embodiment, the agent's e-mail reader is passed the email information via messages from the LCP process 116 to the e-mail reader when the e-mail reader is opened. These can be Dynamic Data Exchange (DDE) messages or some other method of interprocess communication. Such methods of interprocess communication are well-known in the art. In the preferred embodiment, opening of the e-mail reader is accomplished by performing a screen "pop" with the e-mail reader application.

According to the preferred embodiment of the present invention, the E-Mail responder 912 can parse the incoming e-mail into fields. The fields can be arbitrarily specified by the user of the system to meet his or her needs. Alternately, the fields can be assigned prior to system installation. For instance, an e-mail sender could use the subject field of the e-mail to specify the purpose of the e-mail, e.g., PRODUCT to get product information for a certain product. Moreover, the body of the e-mail message could be a template which itself can be parsed by the E-mail responder 912. The parsed information can be passed in the info field of a message, passed by the message router 112, to the agent's PC 60. Alternately, the message router 112 could cause the information to be stored in the database 907, and subsequently retrieved. Once the information is stored in the database, it can be subsequently retrieved at the request of the agent. When the agent requests the information, the result of the database query is displayed to the agent by an agent screen "pop."

Regardless of the E-Mail responder's 912 complexity, certain basic fields are always necessary. For example, the e-mail sender's return address is required so that the call processor of the present invention can respond to the e-mail sender. The purpose, or reason, for the e-mail communication is also important. The purpose of the e-mail communication can be derived by a convention such as that described above. Alternately, the purpose of the communication can be derived by a simple search for key words in the body of the e-mail message.

The of the E-Mail "call" is handled by sending a BLENDED_ORIG message to the system via the message router 112. This message contains fields which indicate the call type of the communication to be an E-Mail call. This message is for compatibility with the report subsystems and real-time supervision tools of the system. As described above with respect to call blending, when the "call" is complete call wrap up is invoked.

Fax transmission blending is another important potential source of customer interaction. As with e-mail, the manager of a call center needs to control and manage fax interactions in the same way voice calls are managed. The agent of the call center can be more productive if faxes are blended with the voice calls they receive. Agents can multitask their time if faxes are presented handling by agent software running on the agent's PC 60.

To blend faxes, a Fax responder process 914 is created to interface with fax sources. Such fax sources include the telephone network, a particular business's local intranet, or the internet. In one embodiment, the Fax responder 914 is written to interface with the public telephone network. Alternately, the fax responder 914 can be written to interface with faxes delivered via the internet. Fax messages are sent to the Fax responder 914. Upon receiving a fax message, the Fax responder 914 read the fax, processes it and dispatches an ANNOUNCE message with a Fax call type. The ANNOUNCE message is sent to each agent's PC 60 in the call center via the message router 112. When the agent PC 60 receives the ANNOUNCE message, the agent PC 60 displays information relating to the fax, if the particular agent processes fax "calls," in the agent's queue list, as described above for voice calls. When an agent selects a fax "call" for further processing from the queue, the agent's fax reader is opened. According to a preferred embodiment of the present invention, the agent's fax reader is preset to respond to the fax. This is accomplished by performing a screen "pop" with the agent's fax application.

According to the preferred embodiment of the invention, the Fax responder 914 can build a prompt tree in front of the fax delivery processing at the voice card. The prompts would enable the fax sender to input information in an audio "form" to provide information that will help the agents determine which agent should select the fax. The purpose or reason for the fax could be entered in much the same way it is entered in the system for voice calls. The recipient or receiving area could also be specified by the fax sender. Any conceivable information could be collected at this time for interaction with the customer's systems for preprocessing of the fax.

Regardless of the Fax responder's 914 complexity, could achieve, certain basic fields are always necessary. For example, the fax sender's ID information may be required to be such that the call processor of the present invention can respond to the fax transmission. The purpose or reason for the fax communication is also important and may be derived by a convention such as that described above.

In the case of faxes received from Internet or intranet sources, an electronic fax responder 916 is created. The electronic fax responder 916 reads faxes from a fax server resident in the network in much the same manner as the e-mail responder 912 reads e-mails and subsequently distributes them to the agent PCs 60. The electronic fax responder 916, however, can only parse a limited set of fax header data. Conventional fax servers contain the address of the fax recipient, and may contain other distribution information or sender information. The electronic fax responder 916 then acts in an analogous manner to the e-mail responder 912 to ultimately cause information related to the electronic fax to appear in the agents' queue list.

Handling of the fax "call" is accompanied by a BLENDED_ORIG message to the system. This message contains fields which show the call type to be a fax "call." This message is for compatibility with the report subsystems and real-time supervision tools of the system. As described above, when the agent's handling of the "call" is complete, the agent can invoke any desired call wrap up processing.

The invention is not limited to the embodiments described above but also includes configurations using different varieties of digital phone lines, analog phone lines or other configurations that are known to those having ordinary skill in the art. Furthermore, while many of the processes used in the present invention are implemented as software running on a general purpose computer, any portion or all of the present system could be implemented in hardware as a special-purpose chip or group of special purpose chips.

What is claimed is:

1. A call processor in a call center having one or more agents to answer calls using one or more agent computers, comprising:

a blander process to blend one or more types of communications for display to said one or more agent;

a central computer to run said blender process;

a computer network to connect said one or more agent computers to said central computer;

a message router, executing on said central computer, for sending messages containing information related to said one or more types of communications to said one or more agent computers; and a queue on each of said one or more agent computers to display said information related to said one or more types of communications to said one or more agents.

2. The call processor of claim 1, further comprising selection means for allowing said one or more agents to select one of said one or more types of communications listed in said queue for further processing.

3. The call processor of claim 2, further comprising filtering means for filtering particular types of communications for display to each of said one or more agents.

4. A method for processing calls in a call center having at least one agent, each agent having an agent's computer and a display device associated with the agent's computer and a computer network connecting each agent's computer to a central computer, comprising the steps of:

(a) creating a queue list top store information relating to communications to the call center to each agent; and (b) receiving a plurality of communications having different communication types;

(c) blending said plurality of communications such that information related to each communication of said plurality of communications is presented to each of the at least one agents in each agent's respective queue list;

(d) presenting said queue list for each agent on the display device associated with the agent's computer.

5. A method for blending communications in a call center, comprising the steps of:

displaying information related to one or more incoming communications to each agent in the call center in a communication list accessible to each respective agent;

allowing an agent to select a communication from the communication list accessible to the agent;

analyzing the communication list accessible to the agent when the agent wraps up handling the communication;

placing an outbound call if the communication list associated with the agent is empty; and connecting the agent to the outbound call thereby blending communications in the call center.

6. The method recited in claim 5, further comprising the steps of:

sending an outbound call request to an outbound call database when the communication list is determined to be empty;

querying the outbound call database to obtain information related to an outbound call in response to the outbound call request;

returning the information related to the outbound call obtained in response to the step of querying the outbound call database; and displaying the information related to the outbound call to the agent in the communication list as a new communication.

7. The method recited, in claim 6, wherein the querying step comprises the steps of:

performing an agent-specific query to obtain the information related to the outbound call; and performing a non-agent-specific query if no information related to any outbound call is received in response to the agent-specific query.

8. The method recited in claim 6, further comprising the steps of setting a database entry to an inactive status to prevent other agents from accessing the information related to the outbound call.

9. The method recited in claim 5, wherein each of the communications can be one of a telephone call, a facsimile, or an e-mail.

10. The method recited in claim 5, displaying a communication type corresponding to each communication in each communication list.

11. The method recited in claim 5, further comprising the step of automatically transferring an inbound communication to an agent for processing.

12. The method recited in claim 5, further comprising the step of automatically placing the outbound call.

13. A system for blending communications in a call center, comprising:

a communication distribution computer having distribution software executing thereon for distributing one or more communications to one or more agents for processing;

a communication list displayed to each of the one or more agents, each communication list comprising information related to the one or more communications, an empty communication list indicating an agent is idle;

means for determining whether a communication list associated with a particular agent is empty;

means for obtaining information related to an outbound call from a database when the communication list associated with a particular agent is empty; and means for presenting the information related to an outbound call to the particular agent in the communication list associated with the particular agent, thereby blending communications in the call center.

14. The system recited in claim 13, further comprising a database, wherein the means for obtaining information related to the outbound call comprises:

means for querying the database using information relating to a particular agent; and means for returning the information related to the outbound call response to the query.

15. The system recited in claim 14, further comprising means for preventing access to a database entry corresponding to the outbound call by other agents in the call center.

16. The system recited in claim 14, further comprising means for automatically placing an outbound call in accordance with the information relating to the outbound call.

17. The system recited in claim 13, further comprising means for placing an outbound call in accordance with the information relating to the outbound call in response to the particular agent selecting the outbound call from the call list.

18. The system recited in claim 14, further comprising means for performing a multi-tiered query, said performing means comprising:
    means for querying the database using information specific to the particular agent; and
    means for querying the database using information that is not specific to the particular agent if no outbound call is found in response to the query using the information specific to the particular agent.

19. The system recited in claim 14, further comprising means for including incoming e-mails in one or more of the call lists.

20. The system recited in claim 14, further comprising means for including incoming facsimiles in one or more of the call lists.

21. A system for blending inbound communications in a call center, comprising:
    a distribution computer coupled to the telephone switch for receiving the one or more inbound communications;
    a queue associated with each agent for displaying information related to the inbound communications;
    a blender process executing on the distribution computer for extracting information related to the inbound communications and sending that information to one or more of the queues so that information sent to a particular queue is displayed to the agent associated with the particular queue; and
    selection means for allowing an agent to select one of the inbound communications from the queue associated with the agent for further processing.

22. The system recited in claim 21, further comprising a telephone switch for receiving telephone calls in the call center, and routing the telephone calls to the distribution computer for processing.

23. The system recited in claim 21, wherein the blender process connects an agent with an idle queue to an outbound call.

24. The system recited in claim 23, further comprising a database for storing outbound calls, and wherein the outbound call is determined by performing a query of the database to obtain the outbound call.

25. The system recited in claim 24, wherein the query comprises information corresponding to the agent with the idle queue.

26. A method for blending communications in a call center, comprising the steps of:
    receiving a plurality of inbound communications in the call center;
    extracting information from each communication;
    posting some or all of the extracted information in each of one or more queues that are displayed to at least one agent thereby blending communications in the call center, wherein the information posted in each queue need not be unique;
    receiving a request for a particular communication from a particular agent on the basis of the extracted information displayed to the particular agent in a queue viewable. by the particular agent; and
    sending the communication to the agent for further processing.

27. The method recited in claim 26, further comprising the steps of:
    determining whether the queue viewable by the particular agent is idle when the agent is in the wrap-up stage of processing the telephone call;
    if the queue associated with the particular agent is idle:
        determining if there is an outbound call to make that can be handled by the particular agent;
        making the outbound call; and
        connecting the particular agent to the outbound call to further blend communications in the call center.

28. The method recited in claim 27, wherein the determination of whether there is an outbound call that can be handled by the particular agent is made by querying a database of outbound calls using information corresponding to the particular agent.

29. The method recited in claim 26, further comprising the step of using predictive dialing to make the outbound call.

30. The method recited in claim 26, further comprising the step of forcing a communication to an agent for processing.

* * * * *

UNITED STATES PATENT AND TRADEMARK OFFICE
CERTIFICATE OF CORRECTION

| | | |
|---|---|---|
| PATENT NO. | : 6,463,148 B1 | Page 1 of 1 |
| APPLICATION NO. | : 09/685033 | |
| DATED | : October 8, 2002 | |
| INVENTOR(S) | : Patrick K. Brady | |

It is certified that error appears in the above-identified patent and that said Letters Patent is hereby corrected as shown below:

On the Title page of the patent at Item (63) line 4, change "application No. 08/595,961" to --application No. 08/595,861--

Signed and Sealed this

Twelfth Day of August, 2008

JON W. DUDAS
*Director of the United States Patent and Trademark Office*